United States Patent [19]

Horak et al.

[11] Patent Number: 4,801,678

[45] Date of Patent: Jan. 31, 1989

[54] POLY(2,6-NAPHTHOQUINONE) FILM AND THE PREPARATION AND USES THEREOF

[75] Inventors: Vaclav Horak, Bethesda, Md.; Mani Mala, Washington, D.C.

[73] Assignee: Georgetown University, Washington, D.C.

[21] Appl. No.: 915,560

[22] Filed: Oct. 6, 1986

[51] Int. Cl.⁴ .............................................. C08G 65/38
[52] U.S. Cl. .................................... 528/219; 528/220; 528/156; 429/213
[58] Field of Search ............... 429/213, 212, 188, 203, 429/207; 528/219, 220, 156

[56] References Cited

U.S. PATENT DOCUMENTS 2,057,676  10/1936  Graves ................................ 528/219
2,069,275   2/1937  Rothrock ........................... 528/219

Primary Examiner—Morton Foelak
Assistant Examiner—M. L. Moore
Attorney, Agent, or Firm—Oblon, Fisher, Spivak, McClelland & Maier

[57] ABSTRACT

A rechargeable electrochemical storage cell comprising a housing, in the interior of which is an anode and a cathode spaced from each other and both provided with a core of glassy carbon, graphite or carbon cloth and both anode and cathode having thereon an electrodeposited coating of poly(2,6-naphthoquinone), said anode and cathode having therebetween an electrolyte of a buffer at a pH in the range of about 6 to 9.

1 Claim, 2 Drawing Sheets

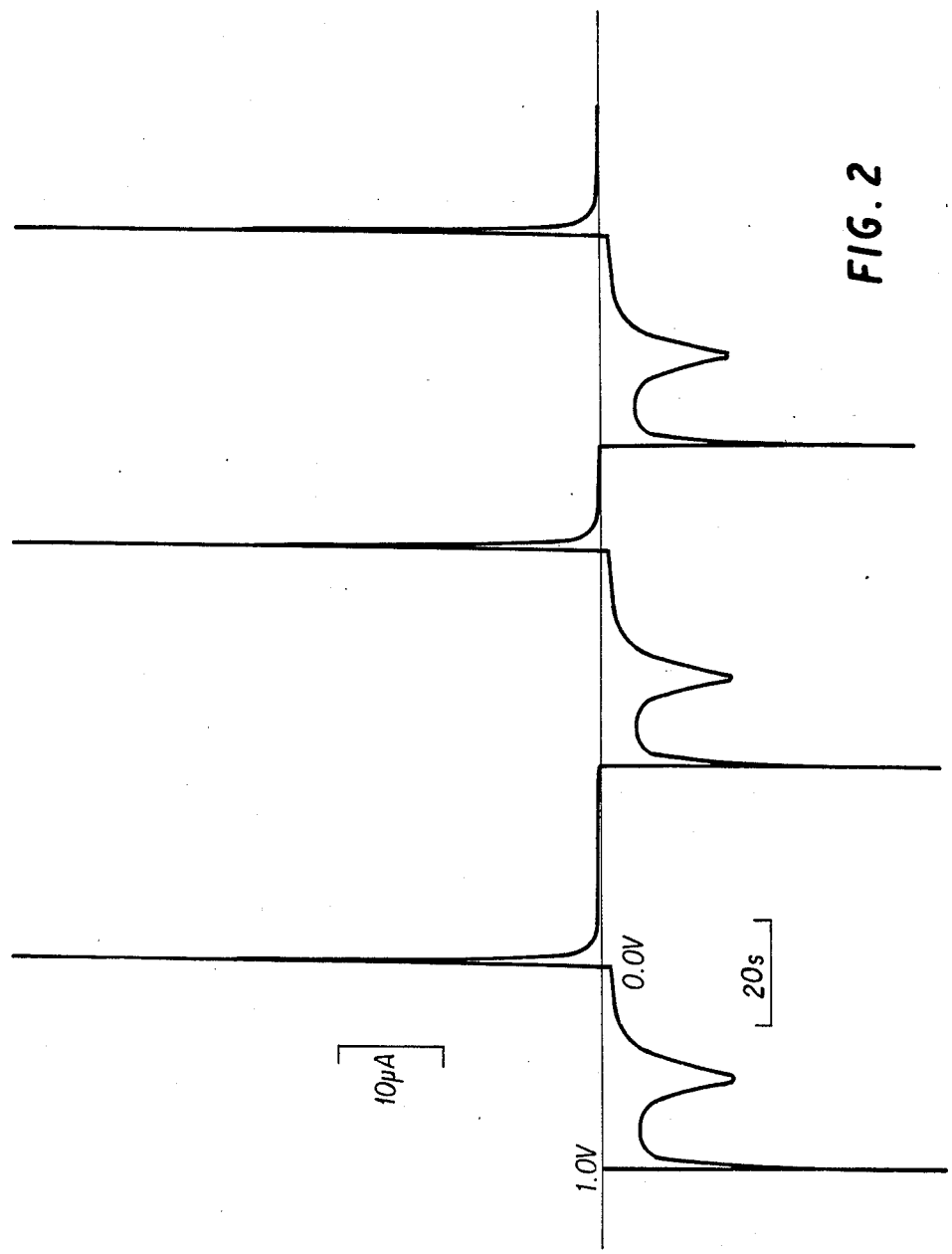

POLY(2,6-NAPHTHOQUINONE) FILM AND THE PREPARATION AND USES THEREOF

BACKGROUND OF THE INVENTION

1. Field of the Invention

The present invention relates to a rechargeable electrochemical storage cell with both anode and cathode made of a particular synthetic polymer and with both the anode and cathode surrounded by a liquid electrolyte.

2. Description of the Background

Electrical energy is conventionally stored in batteries wherein electrons are passed via electrodes into an electrolyte by means of an ionic modification within the battery. Conventional batteries utilize a metallic electrode interacting with an ionic solution, or electrolyte, such that, as the electrode dissolves, electrons are released for ionic storage in the electrolytes. Accordingly, such batteries have often been referred to as ionic batteries inasmuch as the electrical energy is stored and released on an ionic basis. In discharging in ionic batteries, the electrons are released at the electrodes. Such conventional ionic batteries are disadvantageous in that they are very slow to charge, and are able to discharge large currents only for very brief periods of time. Moreover, it is necessary to construct the electrodes of specific and usually rare metals. Also, the electrodes used in such batteries are rapidly consumed, thus imparting to the battery a limited lifetime.

Although attempts have been made to increase the efficiency, charging rate and life time of ionic batteries, such attempts have not met with success due the inherent limitations of the ionic process of energy storage. Of necessity, the ionic process of energy storage mandates relatively long charge times and consumable electrodes due to the inherent low mobility of ions in the electrolyte.

At present, while some work has been done with polymeric anodes and cathodes, the highly unsaturated nature of materials used for such anodes and cathodes, such as polyacetylene, often result in electrodes which are highly sensitive to air. For example, European Patent Application No. 0036118 discloses a rechargeable electrochemical storage cell which has a solid anode and a solid cathode surrounded by a liquid electrolyte. Both the anode and cathode are made of polyacetylene. In particular, the polymer formed in the cathode is doped with halogenide ions and the polymer forming the anode is doped with metallic ions. A major disadvantage of this battery is that the polyacetylene used does not have a particularly long service life if it is exposed to the action of air. Of course, this means that such a storage cell must be encapsulated in an airtight manner if it is intended for long term operation. Of necessity, this makes the manufacturing cost for such a storage cell prohibitively high.

However, the inherent instability under ambient conditions of existing polymeric systems which function as synthetic metals, i.e., conducting can not be overemphasized. For example, polyacetylene, as noted above, is unstable in the presence of oxygen. Moreover, other polymers which are stable to oxygen require the addition of dopants such as $AsF_5$ to obtain an adequate conductivity. Unfortunately, such strong electron-accepting dopants, such as $AsF_5$, are rapidly hydrolyzed in the presence of water, rendering these conductive polymeric systems extremely sensitive to moisture.

Accordingly, a need continues to exist for a non-ionic storage cell which is readily rechargeable and of light weight. A need also continues to exist for such systems which have a high degree of chemical stability, and which, moreover, need not utilize conductivity-enhancing dopants.

SUMMARY OF THE INVENTION

Accordingly, it is an object of the present invention to provide a rechargeable electrochemical storage cell which utilizes an anode and a cathode which are coated with a specific polymeric material having high conductivity and excellent chemical stability.

It is also an object of the present invention to provide a method for preparing an electrode which is coated with a polymeric material which has excellent conductivity and high chemical stability, which can be used in a rechargeable electrochemical storage cell as either an anode or a cathode or both.

It is also an object of this invention to provide a polymeric film which has excellent conductivity and which can be advantageously used in the preparation of the above-described electrode.

According to the present invention, the foregoing and other objects are attained by providing a rechargeable electrochemical storage cell comprising a housing, in the interior of which is an anode and a cathode spaced from each other and both provided with a core of glassy carbon, graphite or carbon cloth, and both anode and cathode having thereon an electrodeposited coating of poly(2,6-naphthoquinone), said anode and cathode having therebetween an electrolyte of a buffer having a pH in the range of about 6 to 9.

BRIEF DESCRIPTION OF THE DRAWINGS

(a) CA of polymer in pH 7 phosphate buffer;
(b) CA of polymer in pH 7 buffer containing $1 \times 10^{-3}$ potassium ferrocyanide; and
(c) CA of potassium ferrocyanide with GCE FIG. 2 is a chronoamperogram of $8.8 \times 10^{-8}$ mol $cm^{-2}$ 2,6-DHN in pH 7 phosphate buffer.

DETAILED DESCRIPTION OF THE PREFERRED EMBODIMENTS

Figure 1:
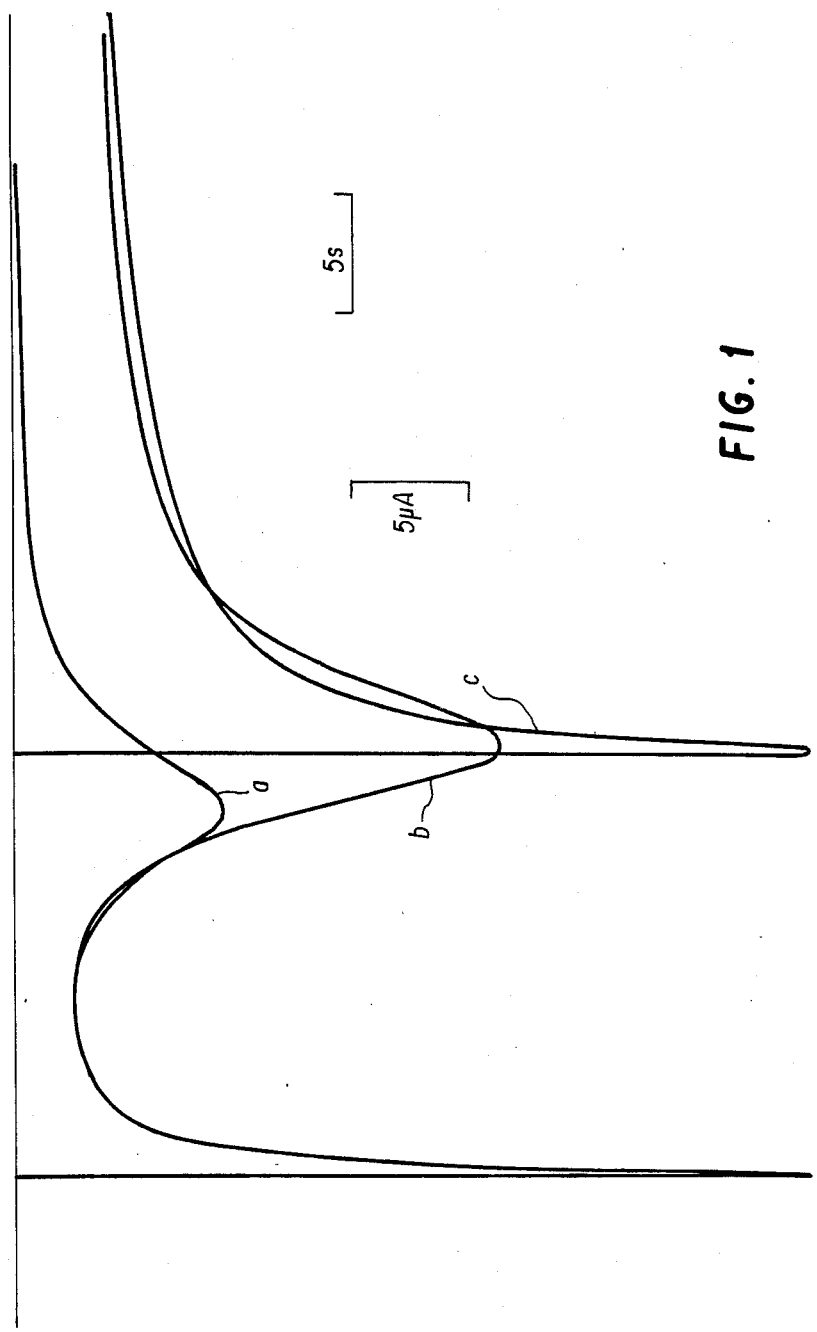
FIG. 1 is a chronoamperogram of $8.8 \times 10^{-8}$ mol $cm^{-2}$ 2,6-DHN (napthalene diol) deposited on GC oxid at 0.4 v Ag/Ag+.

The present invention in all aspects thereof, is premised upon the surprising discovery that a polymeric film of poly(2,6-naphthoquinone) can be prepared which has unique oxidation-reduction properties. It is also premised upon the discovery that a polymeric film of the same material also exhibits repetitive cycling between the oxidized and reduced form thereof indicating applicability as an electric energy storage device.

According to the present invention, a poly(2,6-naphthoquinone) film is now provided which is advantageously used in the preparation of anodes and cathodes. In more detail, the poly(2,6-naphthoquinone) film is electrodeposited either by the steady potential method or the potential sweep method on a core of glassy carbon or carbon cloth to form an electrode which can be used as either an anode or a cathode.

A rechargeable electrochemical storage device can then be constructed in one of two ways. First, a device may be constructed utilizing the electrodes of the present invention as both anode and cathode. Secondly, a device may be constructed utilizing an oxidized form of the poly(2,6-naphthoquinone) film as an anode and utilizing therewith metallic electrode as a cathode.

The first mentioned device is a rechargeable electrochemical storage cell comprising a housing, in the interior of which is an anode and a cathode spaced from each other and both provided with a core of glassy carbon or carbon cloth and both anode and cathode having thereon an electrodeposited coating of poly(2,6-naphthoquinone), the anode and cathode having therebetween an electrolyte of a buffer having a pH in the range of about 6 to 9.

The second device is also a rechargeable electrochemical storage cell comprising a housing, in the interior of which is an anode and a cathode spaced from each other, and wherein the anode is provided with a core of glassy carbon or carbon cloth having thereon an electrodeposited coating of oxidized poly(2,6-naphthoquinone), and wherein said cathode is a metallic electrode, the anode and cathode having therebetween an electrolyte of a buffer having a pH in the range of about 6 to 9.

In conjunction with the second device, it is also possible to use one or more barrier laminates which are porous with respect to electrons, but non-porous with respect to metallic ions. Any such barrier laminate can be used in accordance with the above principle, however, of particular use are the sulfonated polyfluorinated ethylene polymer laminates. An example of this is Masiion ® of Dupont.

In addition to two types of rechargeable electrochemical storage devices, the present invention also relates to a process for depositing electroconductive films at graphite surfaces by the electrooxidation of 2,6-naphthalene diol and oligomers thereof. Such a process provides electrodes which are usable in the above-described electric energy storage device as well as having applicability as an electrochemical timing device. More particularly, the poly(2,6-naphthoquinone) film of the present invention can be converted either to a fully oxidized quinonoid form or a fully reduced quinoloid form. However, the highest observed conductivities are associated with the quinonoid form.

While 2,6-naphthalene diol is the preferred starting material for electrodeposition, it is also possible to commence with oligomers of up to about 20 units of 2,6-naphthalene diol. These oligomers are prepared by treating a solution of 2,6-naphthalene diol in pH 7.0 buffer/10% ethanol with $I_2$ crystals. It has been found that when allowing this reaction to proceed for an extended period of time, a precipitate of the poly(2,6-naphthoquinone) polymer is obtained.

The poly(2,6-naphthoquinone) film can be deposited on the graphite electrode by polarizing either at constant potential or the potential may be sweeped between two potentials. It has been found that the thickness of the film is controlled by the concentration of the substrate and the deposition time.

In more detail, when utilizing the potential sweep method, a solution of about $10^{-2}$ to $10^{-4}$M of 2,6-naphthalene diol in a buffer of a pH range of about 6 to 9 with about 3-20% of a lower alkyl alcohol added thereto to solubilize the 2,6-naphthalene diol is deaerated with a gas such as nitrogen and subjected to a potential which is swept between about $-0.25$ v to $+1.0$ v at about 30 to 50 mV/sec. Gradually, a polymeric film is deposited.

When utilizing the steady potential method, a solution of about $10^{-2}$ to $10^{-4}$ M of 2,6-naphthalene diol in a buffer of a pH range of about 6 to 9 with about 3-20% of a lower alkyl alcohol added thereto to solubilize the 2,6-naphthalene diol is deaerated with a gas such as nitrogen and subjected to a steady potential anywhere in the range of about $+0.4$ to $+1.0$ v. However, it has been found that the use of lower potentials such as in the range of $+0.4$ to $0.75$ with dilute monomer solutions such as in the range of $10^{-3}$ to $10^{-4}$ produce a more coherent electrodeposited polymer film.

As the lower alkyl alcohols which can be used, those having 1 to 6 carbon atoms are preferred. Of these, methyl, ethyl and isopropyl alcohol are most preferred. Of course, it is also possible to use other solvents such as acetone or ethylene glycol to solubilize the 2,6-naphthalene diol in the buffer solution.

Furthermore, it has been found that the film so deposited is mechanically and chemically stable. Washed free of the absorbed substrate, the deposited film can be converted electrochemically in aqueous buffered medium either to its oxidized or reduced form. Conveniently, and quite surprisingly, the poly(2,6-naphthoquinone) film of the present invention allows repetitive cycling between the oxidized and reduced form as noted above.

It has been found that the mode of the film deposition, either by steady sweep or potential sweep method, greatly influences the order of the deposited layers which influence the mechanical and chemical stability as well as the electrochemical behavior of the electrode. Other factors which appear essential for the deposition of such stable electroactive films are, in particular, pH and temperature.

As noted above, it is important that the pH of the electrolytic solution during electrodeposition and during the performance of a battery sing the polymeric film of the present invention as an electroactive electrode material be maintained in a range of about 6 to 9. In order to accomplish this, any buffer system may be utilized which maintains such a pH range. For example, a barbital or veronal buffer system may be used having a pH range of about 6.8-9. Alternatively, a borate buffer system having a pH range of about 6-8 may be used. However, it is preferred if a phosphate buffer having a pH of about 7.0 is used.

With respect to temperature, it is preferred that the immediate environment of the electrodeposition apparatus or battery be maintained in an ambient range. However, a temperature range of about 0°-60° C. is satisfactory for both purposes. However, it is preferred if the temperature is maintained between about 10°-50° C.

With respect to the substrate upon which the polymeric film may be deposited, according to the present invention, it is possible to use glassy carbon, graphite or carbon cloth.

With respect to the various metallic electrodes which can be used with the present battery, particular note can be made of zinc, lead, cadmium or even mercury electrodes. However, of these the zinc electrode is preferred.

Moreover, it has been found that the thickness of the deposited film was controlled by the substrate concentration in the electrolyte from which the film is deposited as well as the deposition time. The capacity of the obtained film is controlled by the dimensions of the graphite electrode surface and the film thickness. It has been found that materials having a large surface area such as porous graphite or carbon cloth are particularly well suited for the development of a high capacity electrode.

Also, in accordance with the present invention, it has been found that film deposited under a potential sweep method or cycling mode, on a glassy carbon electrode using a solution of 2,6-naphthalene diol in a buffer having a pH in the range of about 6 to 9, exhibits the properties of an electrochemical timer. Particularly, in a phosphate buffer at a pH of about 7.0, in the absence of 2,6-naphthalene diol in solution, when polarized anodically, the reduced film undergoes time separated two-step oxidation. The time delay between the two signals depends both on internal as well as on external factors. The oxidized film polarized cathodically is reduced in a single step. The oxidation-reduction cycle can be repeated reproducibly many times before it changes in the behavior of the film are observed. It is this aspect of the present invention that evidences usefulness as an electrochemical timing device.

Preparing the Poly(2,6-Naphthoquinone) Coated Electrode

In general, the poly(2,6-naphthoquinone) film can be deposited on either a glassy carbon electrode, a graphite electrode or a carbon cloth electrode by electrodeposition from a $10^{-2}$ to $10^{-4}$ molar solution of 2,6-naphthalene diol in a buffer in a pH range of about 6 to 9 by cycling repeatedly about 4 times between $-0.25$ to $+1.0V$ using a reference electrode of silver/silver chloride, or by using the steady sweep method as described above.

The preparation of the electrode will now be demonstrated specifically by the following two examples, one of which utilizes the potential sweep method, the other utilizing the steady potential method. Of course, these examples are provided for purposes of illustration only and are not intended to limit the present invention.

Example 1: Preparation of a poly(2,6-naphthoquinone) film on a glassy carbon electrode from a solution of 2,6-naphthalene diol utilizing the potential sweep method.

In a three electrode cell with a working electrode of freshly polished glassy carbon, a reference electrode of silver/silver chloride, and a counter electrode of platinum wire, a $10^{-3}$ molar solution of 2,6-naphthalene diol in 10% ethanol/pH 7 phosphate buffer is utilized and deaerated by passing therethrough nitrogen gas.

The potential of the working electrode is swept between about $-0.25$ and $+1.0V$ at 30 to 50 mV/s. Eventually a film of polymeric 2,6-naphthalene diol film gets deposited on the glassy carbon electrode. After a few cycles the growth of the film almost stops as the reduced film is poorly conducting and the oxidation of the deposited film requires more time as the thickness of the film increases. However, this deposited film can be conveniently used to demonstrate the time separated two-step oxidation of the film at a pH of about 7 as well as the charging-discharging properties of the film.

Example 2: Preparation of a poly(2,6-naphthoquinone) film at glassy carbon electrode from a solution of 2,6-naphthalene diol using the steady potential method.

The experimental set up is as in Example 1. However, for the film deposition, the potential of the working electrode is set steady at any value between about 0.4 and 1.0V. However, lower polymerization potentials, such as 0.4V, for example, and dilute solutions of the 2,6-naphthalene diol, about $5 \times 10^{-4}M$, for example, produce a much more coherent film. Moreover, utilizing this method, it is possible to obtain greater amounts of the polymer deposited at the electrode. This film also exhibits the time-separated two step oxidation in the repeated charging-discharging ability.

Quite unlike other polymeric conductive substances which are merely coated on electrode materials by dipping the electrode into solutions of the polymer, the present electrodes are made preferably by electrodepositing the polymeric material on the electrodes. While it is certainly possible that the polymeric material of the present invention can be coated on the present carbon electrodes by a routine coating technique, it has been found that, in accordance with the present invention, by electrodepositing the polymeric material of the present invention on the glassy carbon electrode, the carbon cloth electrode, or the graphite electrode, that the film so formed can now be produced in a much more uniform way, providing better adherence to the electrode of a much higher conductivity.

Properties of the Poly(2,6-Naphthoquinone) Electrode

In order to test an electrode formed in accordance with either of the above methods, the following procedure was conducted:

Example 3

The electrode produced above in accordance with the potential sweep method, was rinsed repeatedly with distilled water. Removal of the film from the electrode surface in compact form failed due to the brittle character of the material. However, for maximum reproducibility freshly prepared fully hydrated films were used in all measurements. Nevertheless, even completely dried film exhibited some of the properties similar to those of the freshly prepared ones.

The film coated electrode was stable and electrochemically active in aqueous buffers between a pH of about 6 and 10 both in anodic and cathodic regions. Cyclic voltamonograms recorded at 60(a) and 30 mV/sec (b) scan rates between $-0.5$ to $+1.0V$ versus Ag/AgCl in pH 7.0 phosphate buffer were conducted. The curves evidenced the time dependence of the anodic processes. The latter are also dependent upon pH, temperature and film thickness. In non-buffered solution, such as 0.1 molar KCl, the film did not exhibit the characteristic behavior.

The two phase character of the anodic processes was clearly demonstrated on a chronoampergram and was recorded with a film coated electrode polarized at $+1.0$ V versus Ag/AgCl in phosphate buffer at a pH of 7.0. The two time separated anodic steps followed by a single cathodic process after the potential was stepped to 0.0 VAg/AgCl represents a cycle which was repeated many times.

However, the time separation between the two anodic peaks gradually increased and the second peak became broader indicating structural changes of the film. Moreover, the chronocoulometry revealed an approximately 1:1:2 coulomb ratio for the two anodic and the single cathodic steps. From the number of coulombs determined for a film deposited from a phosphate buffer pH 7.0 and $10^{-3}$ molar of 2,6-naphthalene diol with six cycles between $-0.5$ and $1.0V$ versus Ag- /AgCl, the approximate number of layers calculated was 900. This calculation was based on the assumption that the monomer occupied 70 Å and the molecules were oriented parallel to the electrode surface. Of all the experimental variables, it appears that the pH is the most important in determining the character of the reported electrode processes. The two-phase character of the anodic process is observed at a narrow pH range about 7.0. This is indicative of a slow protron transport in the film, which is even lower at more acidic pH. This behavior observed in the cyclic voltamonagram measurements at this pH clearly suggests a lower conductivity of the film in the reduced than in the oxidized form. This was supported by experiments in which the modified electrode was used to oxidize or reduce various substrates.

In particular, the film in the oxidized form was able to exchange electrodes with ferrocyanide ions, but no reduction of ferricyanide ions was observed because the film was reduced prior to the reduction of a substrate.

Furthermore, the two phase character of the oxidation depends of the regularity of the film packing and the quality of the electrode material. For example, a film deposited on glassy carbon by steady potential oxidation of 2,6-naphthalene diol at 1.0V versus Ag-/AgCl did not show a well defined two-step oxidation. The same observation was made with the film deposited on carbon fiber by cycling.

This suggests the importance of the regular packing of the film which controls diffusion of the hydrogen ions (H+) into the surrounding electrolyte. Repetition of the oxidation reduction cycles causes defects in the regular packing of the film. This results in the gradual changes in the electrochemical behavior of the modified electrode.

The two-phase oxidation of the film appears to result from the cooperative effects of all of the above factors. Thus, in the first phase, the polymer layers adhere into the electrode surface are oxidized rapidly. However, the drop in pH due to the liberated hydrogen ions slows down the electron transfer. As the protons diffuse slowly out, as the conductivity of the gradually oxidized film increases, and as the diffusion of the hydrogen ions increases in the layers close to the film surface, the range of the film oxidation increases and a time delayed current peak appears on the chronoampergram.

Due to the time delay between the two signals indicating two-step oxidation, and given the repetitive cycling nature of this phenomenon, the present electrodes can be advantageously used in an electrochemical timing device. In this respect, it is noted that the time delay related to such a two-step oxidation is in the range of 5 to 60 seconds. Quite uniquely, the polymeric materials of the present invention can now be used to provide a time-delay function when incorporated into a relay system.

However, in accordance with the present invention, the present electrodes can also be used quite advantageously in the preparation of a rechargeable electrochemical storage device.

One advantage of the present invention over the conventional electrodes are that the electrical energy storage devices, according to the present invention, have electrodes which are relatively non-consumable. Moreover, the electrical storage devices of the present invention have an extremely rapid charging time and are relatively light weight. Of particular interest, is the fact that the present electrodes exhibit extremely high conductivity.

As described above, in general terms, the present electrodes can either be used in a half-cell capacity, with other electrodes, or can be used together in a full-cell capacity. For example, within the ambit of the present invention are rechargeable electrochemical storage devices which contain an anode and a cathode both provided with a core of glassy carbon, carbon cloth or graphite and having thereon an electrodeposited coating of poly(2,6-naphthoquinone), with the anode and cathode having therebetween an electrolyte of a buffer having a pH in the range of about 6 to 9.

Also, in accordance with the present invention it is possible to prepare a rechargeable electrochemical storage cell, the anode of which utilizes a core of glassy carbon, carbon cloth or graphite and has thereon an electrodeposited coating of the present polymer in highly oxidized form, i.e. quinonoid form, and wherein the cathode is a zinc electrode.

The rechargeable electrochemical storage devices of the present invention are different from most conventional storage devices in that the voltages required for charging the present storage cells are quite low. For example, a dopamine-melanin polymer material has been used to coat metal plates in the preparation of a conventional electric storage device. However, such a storage device requires a charge of 200 volts for at least 10 seconds in order to charge the device. However, by contrast, the rechargeable electrochemical storge device of the present invention requires a charge voltage of only up to about 12 volts. Of course, higher voltage can be used, but only 12 volts are required.

Aside from the use of the particular polymeric anodes or cathodes of the present invention, and from the particular combination of highly oxidized polymer as the anode and the metallic electrode as a cathode, and from the particular electrolyte used in the present invention, the fundamental gross design for the rechargeable electrochemical cells of the present invention are quite similar to a conventional cell design. For example, a cell design similar to that utilized in U.S. Pat. No. 4,532,195 can be adopted for the present invention. In this respect, this U.S. patent is incorporatedherein in the entirety.

Of course, the particular anodes and cathodes which are used in the present storage cells are as described above. Moreover, the electrolytic solution which is used between the anodes and cathodes of the present battery, is any buffer which can maintain a pH between a range of 6 to 9. However, most advantageously, a phosphate buffer having a pH of about 7.0 is used as the electrolyte solution. In this respect, it is found that at a lower pH, the oxidation of thick films tends to be very slow, whereas at a much higher pH, the film is more rapidly consumed.

Furthermore, oxidation of the film can be performed at any potential between about 0.4 to 1.25V, while reduction of the film can be effected at any potential below 0.0V. However, extreme values of either oxidation and reduction potentials cause rapid deterioration of the film. Otherwise, the oxidation and reduction of the film can be repeated many times and the film is quite stable in either oxidized or reduced conditions.

Thus, a preferred range of oxidation potential is +0.4 to +1.0V, and more preferably+0.4 to +0.75V. A preferred range of reduction potential is from 0.0 to −0.5V, and more preferably from 0.0 to −0.25V.

With respect to voltages which are obtained with the present electrodes as half-cells or full-cells, the present inventors have found that when using poly(2,6-naphthoquinone) coated glassy carbon, carbon cloth or graphite electrodes as both anode and cathode, a potential difference of up to 0.3V is obtainable. However, if the highly oxidized form of the polymer, i.e. quinonoid form, is utilized as the active material on the anode, and a zinc electrode is used as a cathode, a potential difference of up to 1.5V is observed.

It is noted that the zinc electrode referred to in this specification is a standard zinc electrode having a potential of about +0.76V which is commercially available from any chemical supply service.

Moreover, all of the other metallic electrodes which can be used such as the mercury, cadmium or lead electrodes are also standard electrodes which are commercially available.

Moreover, a still more preferred aspect of the half-cell arrangement entails the use of a membrane of sulfonated polyfluorinated ethylene, such as Masiion® membrane of Du Pont which allows the transfer through of electrons but not of zinc ions. It has been found that the positioning of such a membrane between the anode and cathode, when utilizing the zinc electrode as the cathode, results in an even more superior performance. It is believed that this particular type of barrier membrane is especially advantageous with the present system.

Of course, other conventional aspects of battery technology are equally applicable to the present rechargeable electrochemical storage devices. For example, barrier laminations may be generally used to prevent ion movement while permitting passage of metallic ions therethrough. In this respect, the opposing electrodes can be disposed in contact without the sittings of such laminated polymeric barrier materials and can be made of an suitably electrically conductive material. In this respect, U.S. Pat. No. 4,366,216 is incorporated herein.

Additionally, in accordance with the present invention, the poly(2,6-naphthoquinone) film of the present invention can be polyfluorinated to stabilize the polymer. This can be accomplished either by fluorinating the monomer, oligomer or polymer by any conventional technique for effecting the same. For example, these compounds can be fluorinated by the reaction of the same in a solvent with $CoF_3$, $XeF_2$ or even a mixture of $PbO_2$ and $SF_4$, by adapting well known procedures. See *J. Org. Chem.* 28, 494 (1963) Rausch et al; ot *J. Chem. Soc. Chem. Comm.*, (1973) Zupan et al or *J. Org. Chem.*, 29, 1591 (1964). All of these procedures are conventional and well within the skill of one of ordinary skill in the art.

The present invention now provides electrodes and batteries using the same which are light weight. Moreover, the polymeric films of the present invention are quite conductive and capable of a very high capacity.

It has been found that the present polymeric films have a specific resistance of about 120 ohms.

Having now fully described the present invention, it will be apparent to one of ordinary skill in the art that many changes and modifications can be made thereto without departing from the spirit or scope of the invention as set forth herein.

What is claimed as new and desired to be secured by Letters Patent of the United States is:

1. A polymer, which is poly(2,6-naphthoquinone) or the reduced quinoloid counterpart thereof, or the oxidized quinonoid counterpart thereof.

* * * * *